(12) United States Patent
Glavin (10) Patent No.: US 11,070,925 B2
(45) Date of Patent: *Jul. 20, 2021

(54) HEARING DEVICE INCORPORATING DYNAMIC MICROPHONE ATTENUATION DURING STREAMING

(71) Applicant: Starkey Laboratories, Inc., Eden Prairie, MN (US)

(72) Inventor: Courtney Shea Coburn Glavin, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/399,462

(22) Filed: Apr. 30, 2019

(65) Prior Publication Data

US 2019/0261097 A1   Aug. 22, 2019

Related U.S. Application Data

(63) Continuation of application No. 15/428,735, filed on Feb. 9, 2017, now Pat. No. 10,284,969.

(51) Int. Cl.
H04R 25/00 (2006.01)

(52) U.S. Cl.
CPC ......... *H04R 25/505* (2013.01); *H04R 25/356* (2013.01); *H04R 25/43* (2013.01); *H04R 25/407* (2013.01); *H04R 2225/41* (2013.01)

(58) Field of Classification Search
CPC combination set(s) only.
See application file for complete search history.

(56) References Cited

U.S. PATENT DOCUMENTS

| | | | |
|---|---|---|---|
| 7,269,269 | B2 | 9/2007 | Hamacher et al. |
| 7,349,549 | B2 | 3/2008 | Bachler et al. |
| 7,428,312 | B2 | 9/2008 | Meier et al. |
| 7,738,667 | B2 | 6/2010 | Bramslow et al. |

(Continued)

FOREIGN PATENT DOCUMENTS

| | | |
|---|---|---|
| EP | 1432282 | 4/2013 |
| EP | 1414271 | 6/2013 |

(Continued)

OTHER PUBLICATIONS

Search Report dated Apr. 30, 2018 from EP Application No. 181561671.1, 9 pages.

*Primary Examiner* — Amir H Etesam
(74) *Attorney, Agent, or Firm* — Mueting Raasch Group (57) ABSTRACT

A hearing device comprises a microphone configured to produce microphone signals and is coupled to an input of a first amplifier. A wireless transceiver is configured to receive an audio stream and is coupled to an input of a second amplifier. The second amplifier is configured to amplify the audio stream at a pre-established gain. A digital signal processor (DSP) is coupled to the microphone and the first and second amplifiers. The DSP is configured to monitor the microphone signals for a predetermined sound type of interest to the wearer during playback of the audio stream by a speaker and, while maintaining playback of the audio stream at the pre-established gain, automatically adjust gain of the first amplifier coupled to the microphone in response to detecting the predetermined sound type of interest.

22 Claims, 9 Drawing Sheets

(56) References Cited

U.S. PATENT DOCUMENTS

| | | |
|---|---|---|
| 7,869,606 B2 | 1/2011 | Fichtl et al. |
| 8,139,779 B2 | 3/2012 | Barthel et al. |
| 8,150,044 B2 | 4/2012 | Goldstein et al. |
| 8,150,045 B2 | 4/2012 | Thuy et al. |
| 8,588,442 B2 | 11/2013 | Schmitt et al. |
| 8,611,569 B2 | 12/2013 | Cornelissse et al. |
| 8,718,288 B2 | 5/2014 | Woods et al. |
| 8,798,296 B2 | 8/2014 | Schmitt et al. |
| 8,913,769 B2 | 12/2014 | Fellner et al. |
| 10,284,969 B2 * | 5/2019 | Glavin .................. H04R 25/43 |
| 2006/0227976 A1 | 10/2006 | Csemak et al. |
| 2007/0217620 A1 | 9/2007 | Zhang et al. |
| 2007/0219784 A1 | 9/2007 | Zhang et al. |
| 2008/0112583 A1 | 5/2008 | Komagel |
| 2009/0092270 A1 | 4/2009 | Ho et al. |
| 2010/0278365 A1 | 11/2010 | Brundo et al. |
| 2011/0058698 A1 | 3/2011 | Buhmann et al. |
| 2011/0137649 A1 | 6/2011 | Rasmussen et al. |
| 2011/0137656 A1 | 6/2011 | Xiang et al. |
| 2013/0322668 A1 | 12/2013 | Zhang et al. |
| 2014/0064528 A1 | 3/2014 | Flood et al. |
| 2014/0105433 A1 | 4/2014 | Goorevich et al. |
| 2014/0177888 A1 | 6/2014 | Zhang et al. |
| 2015/0281857 A1 * | 10/2015 | Hau ..................... H04R 25/353 381/317 |
| 2017/0149461 A1 | 5/2017 | Han et al. |

FOREIGN PATENT DOCUMENTS

| | | |
|---|---|---|
| EP | 2840807 | 3/2015 |
| WO | 2011001433 | 1/2011 |

* cited by examiner

HEARING DEVICE INCORPORATING DYNAMIC MICROPHONE ATTENUATION DURING STREAMING

RELATED PATENT DOCUMENTS

This application is a continuation of U.S. patent application Ser. No. 15/428,735, filed Feb. 9, 2017, which is incorporated herein by reference in its entirety.

TECHNICAL FIELD

This application relates generally to hearing devices, including hearing aids and other hearables.

BACKGROUND

Hearing instruments can incorporate a radio and an antenna to wirelessly communicate with other devices. For example, a hearing instrument may receive audio from a transceiver which is connected to a television or a radio. This audio may be reproduced by the speaker of the hearing instrument, hereby allowing the wearer to hear the audio source without having to disturb others by turning up the volume on the audio source.

SUMMARY

According to some embodiments, a method implemented by a hearing device adapted to be worn by a wearer involves receiving an audio stream via a wireless transceiver of the hearing device, and playing back the audio stream to the wearer at a pre-established gain via a speaker of the hearing device. The method involves monitoring, using a microphone of the hearing device, for a predetermined sound type of interest to the wearer during playback of the audio stream. While maintaining playback of the audio stream at the pre-established gain, the method also involves automatically adjusting gain of the microphone in response to detecting the predetermined sound type of interest. The method further involves concurrently playing back the audio stream at the pre-established gain and the predetermined sound type of interest at the adjusted gain.

According to other embodiments, a hearing device adapted to be worn by a wearer comprises a microphone configured to produce microphone signals. The microphone is coupled to an input of a first amplifier. A wireless transceiver is configured to receive an audio stream, and is coupled to an input of a second amplifier. The second amplifier is configured to amplify the audio stream at a pre-established gain. The hearing device comprises a speaker and a digital signal processor (DSP) coupled to the microphone and the first and second amplifiers. The DSP is configured to monitor the microphone signals for a predetermined sound type of interest to the wearer during playback of the audio stream by the speaker and, while maintaining playback of the audio stream at the pre-established gain, automatically adjust gain of the first amplifier coupled to the microphone in response to detecting the predetermined sound type of interest.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

It is understood that the embodiments described herein may be used with any hearing device without departing from the scope of this disclosure. The devices depicted in the figures are intended to demonstrate the subject matter, but not in a limited, exhaustive, or exclusive sense. It is also understood that the present subject matter can be used with a device designed for use in or on the right ear or the left ear or both ears of the wearer.

Hearing devices, such as hearing aids and hearables (e.g., wearable earphones), typically include an enclosure, such as a housing or shell, within which internal components are disposed. Typical components of a hearing device can include a digital signal processor (DSP), memory, power management circuitry, one or more communication devices (e.g., a radio, a near-field magnetic induction device), one or more antennas, one or more microphones, and a receiver/speaker, for example. More advanced hearing devices can incorporate a long-range communication device, such as a Bluetooth® transceiver or other type of radio frequency (RF) transceiver.

Hearing devices of the present disclosure can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4.2 or 5.0) specification, for example. It is understood that hearing devices of the present disclosure can employ other radios, such as a 900 MHz radio.

Hearing devices of the present disclosure are configured to receive streaming audio (e.g., digital audio data or files) from an audio source. Representative audio sources (also referred to herein as accessory devices) include an assistive listening system, a TV streamer, a radio, a smartphone, a cell phone/entertainment device (CPED) or other electronic device that serves as an audio source. An audio source may also be another hearing device, such as a second hearing aid. Wireless assistive listening systems, for example, are useful in a variety of situations and venues where listening by persons with impaired hearing have difficulty discerning sound (e.g., a person speaking or an audio broadcast or presentation). Wireless assistive listening systems can be useful at venues such as theaters, museums, convention centers, music halls, classrooms, restaurants, conference rooms, bank teller stations or drive-up windows, point-of-purchase locations, and other private and public meeting places.

The term hearing device refers to a wide variety of devices that can aid a person with impaired hearing. The term hearing device also refers to a wide variety of devices that can produce optimized or processed sound for persons with normal hearing. Hearing devices of the present disclosure include hearables (e.g., wearable earphones, headphones, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices. Hearing devices can also be referred to as assistive listening devices in the context of assistive listening systems. Throughout this disclosure, reference is made to a "hearing device," which is understood to refer to a single hearing device or a pair of hearing devices.

Figure 1:
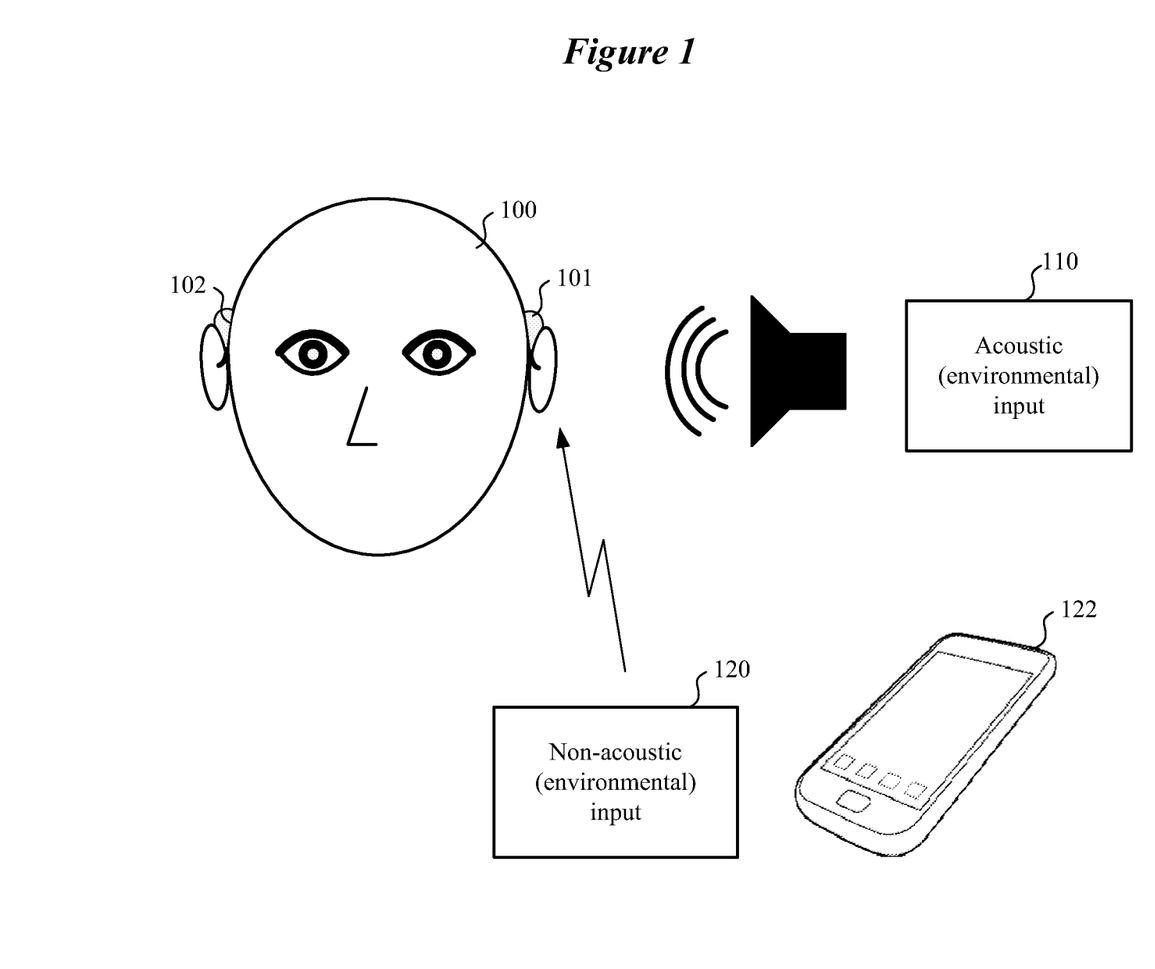
FIG. 1 shows a wearer of a hearing device within an acoustic environment, the hearing device receiving acoustic and non-acoustic inputs simultaneously.

Referring now to FIG. 1, a wearer 100 of a hearing device 101 (and optionally 102) is located within an environment wherein various types of acoustic input 110 are generated or present. For simplicity of explanation, the following discussion will refer generally to hearing device 101, it being understood that the discussion also applies to use of both hearing devices 101 and 102. Typical acoustic input 110 present within the environment includes human speech, laughter, music, environmental noise (e.g., wind, rain), and ambient noise, for example. The various types of sounds present within the environment which can be detected by the hearing device 101 are collectively referred to as acoustic input 110. In addition to acoustic input 110, the wearer 100 can be subject to non-acoustic input 120 within the environment. Non-acoustic input 120 is any audio that originates from a non-acoustic source, such as a streaming source, that can be received by a transceiver of the hearing device 101.

As can be seen in the illustration of FIG. 1, the hearing device 101 can have two different inputs at any given time while wirelessly streaming. The first input is the audio stream itself, which is shown as the non-acoustic input 120. This stream may originate from an accessory device 122 (e.g., smartphone) or from another wireless hearing device (e.g., hearing device 102). The hearing device 101 picks up this wireless signal directly from the transmitting device 122 via a wireless antenna that is housed in the hearing device 101. The second input, which is shown as the acoustic input 110, comes from the microphone(s) of the hearing device 101. Any acoustic input 110 is picked up by the hearing device microphone(s) and follows the traditional amplification pathway.

Listening tests have indicated that the hearing device microphone can have a negative impact on the sound quality of a streamed signal from an accessory device. This is partially due to the fact that memory environments dedicated for streaming prescribe more low frequency gain (relative to a normal memory environment) in order to account for the lack of direct path while streaming. When the hearing device microphone is on while streaming, more gain is applied to the acoustic input relative to the memory environments primarily used for acoustic inputs. This can cause the perception of increased microphone noise and environmental noise in the streaming memories relative to the normal memory. In the past, this has led to wearer complaints of "noise" and "static" while streaming. These complaints can be mitigated by implementing microphone attenuation while streaming in accordance with the present disclosure.

Embodiments of the disclosure are directed to dynamically changing the degree of microphone attenuation of a hearing device based on the acoustic environment while receiving a wireless stream. The wireless stream may be of different types and received by the hearing device using different components, such as a radio frequency transceiver, a telecoil or a loop system of the hearing device. Embodiments of the disclosure are directed to algorithmically detecting presence of a predetermined sound type in the acoustic environment, and automatically adjusting gain of the hearing device microphone(s) in response to detecting the predetermined sound type of interest to the listener. For example, an environmental classification (EC) technique can be implemented by the hearing device to detect the presence of a predetermined sound type in the acoustic environment. A useful EC technique is one that detects, classifies, and adapts to various acoustic environments.

According to some embodiments, if the predetermined sound type of interest to the listener is present during streaming, the microphone attenuation lessens such that the gain applied to the microphone input is adjusted to a pre-established level, which may be the same as the gain applied to the streamed input. If the predetermined sound type of interest to the listener is not present, the microphone attenuation increases. This attenuation of the microphone gain can occur in all channels or in a subset of channels. Automatically varying the amount of attenuation of the hearing device microphone(s) allows for the full elimination of noise (e.g., microphone or wind noise) during streaming when there is no acoustic signal of interest to the listener present in the environment. This provides for improved sound quality when streaming while ensuring that any acoustic signal of interest to the listener in the environment will be heard by the listener.

Figure 2:
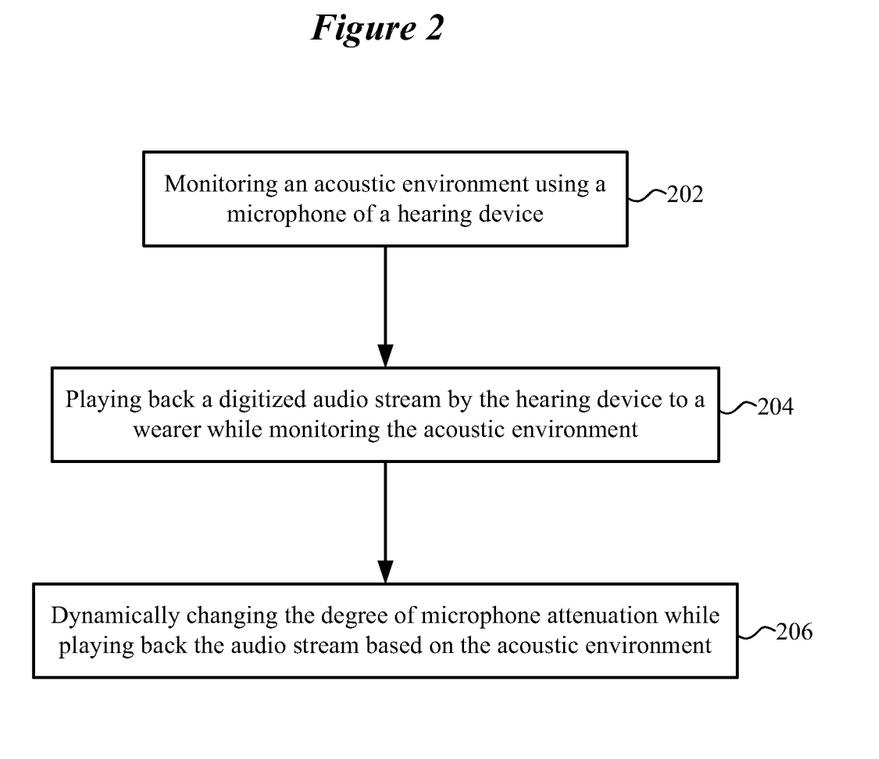
FIG. 2 shows a method of controlling microphone gain of a hearing device while streaming in accordance with various embodiments.

FIG. 2 shows a method of controlling microphone gain of a hearing device while streaming in accordance with various embodiments. The method shown in FIG. 2 involves monitoring 202 an acoustic environment using a microphone of the hearing device. The method also involves playing back 204 a digitized audio stream by the hearing device to a wearer while monitoring the acoustic environment. The method further involves dynamically changing 206 the degree of microphone attenuation while playing back the audio stream based on the acoustic environment.

Figure 3:
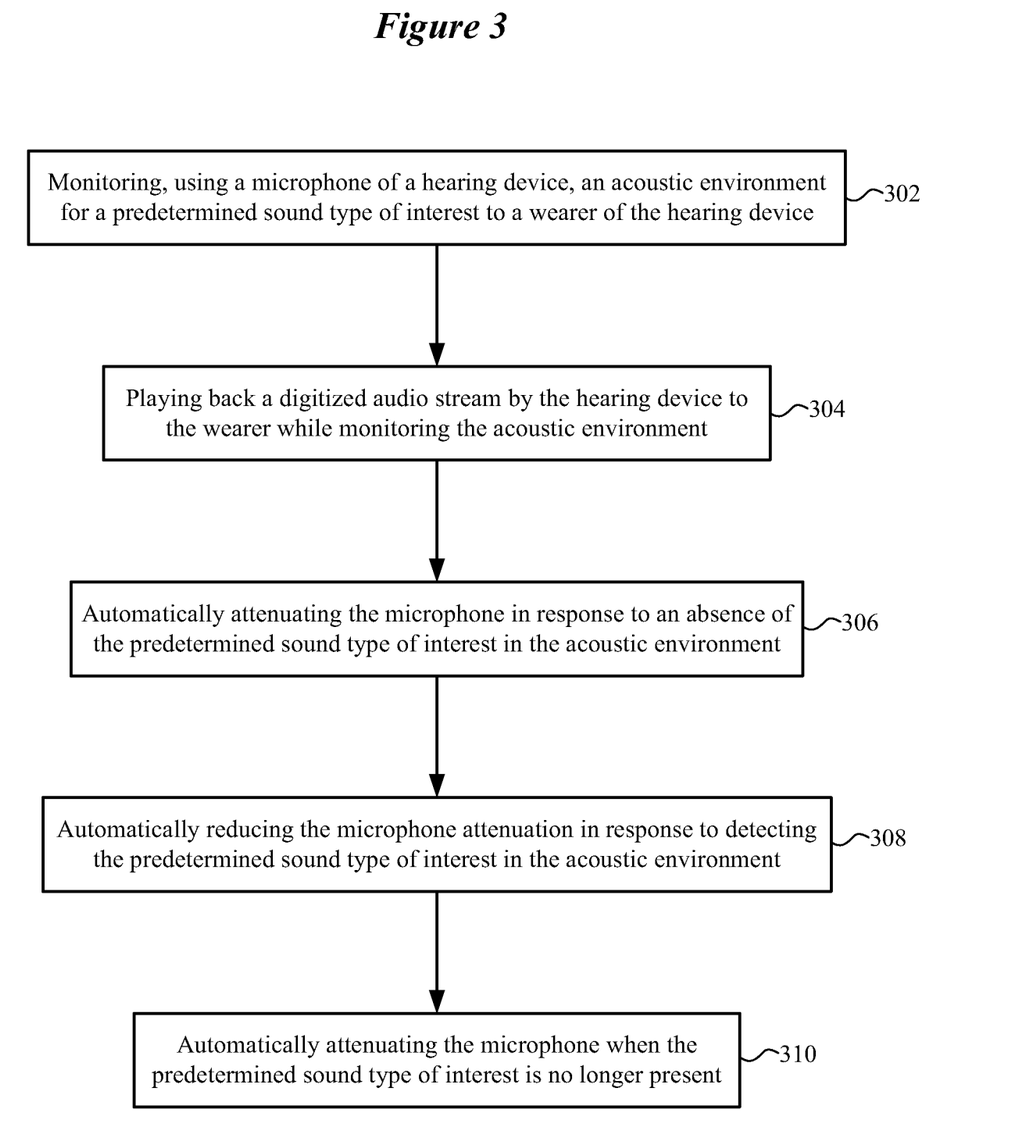
FIG. 3 shows a method of controlling microphone gain of a hearing device while streaming in accordance with other embodiments.

FIG. 3 shows a method of controlling microphone gain of a hearing device while streaming in accordance with other embodiments. The method shown in FIG. 3 involves monitoring 302, using a microphone of a hearing device, an acoustic environment for a predetermined sound type of interest to a wearer of the hearing device. The method involves playing back 304 a digitized audio stream by the hearing device to the wearer while monitoring the acoustic environment. The method also involves automatically attenuating 306 the microphone in response to an absence of the predetermined sound type of interest in the acoustic environment. The method further involves automatically reducing 308 the microphone attenuation in response to detecting the predetermined sound type of interest in the acoustic environment. The method also involves automatically attenuating 310 the microphone when the predetermined sound type of interest is no longer present in the acoustic environment.

Figure 4:
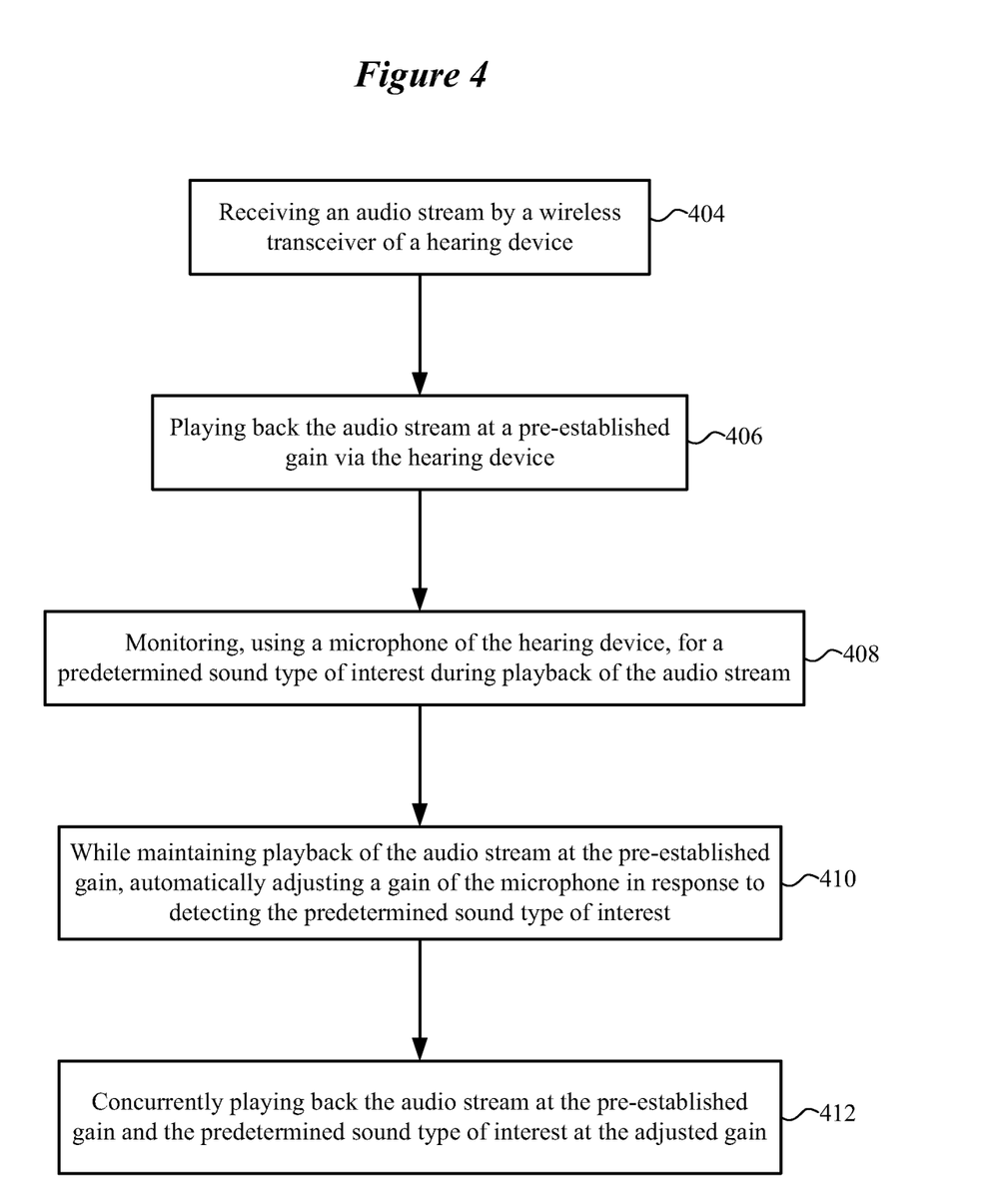
FIG. 4 shows a method of controlling microphone gain of a hearing device while streaming in accordance with various embodiments.

FIG. 4 shows a method of controlling microphone gain of a hearing device while streaming in accordance with further embodiments. The method shown in FIG. 4 involves receiving 404 an audio stream by a wireless transceiver of a hearing device. The method involves playing back 460 the audio stream at a pre-established gain via the hearing device. The method also involves monitoring 408, using a microphone of the hearing device, for a predetermined sound type of interest during playback of the audio stream.

While maintaining playback of the audio stream at the pre-established gain, the method further involves automatically adjusting 410 gain of the microphone in response to detecting the predetermined sound type of interest. The method also involves concurrently playing back 412 the audio stream at the pre-established gain and the predetermined sound type of interest at the adjusted gain. In some embodiments, the adjusted gain of the microphone is the same as the pre-established gain of the audio stream playback. In other embodiments, the adjusted gain of the microphone is lower than the pre-established gain of the audio stream playback. In further embodiments, the adjusted gain of the microphone is greater than the pre-established gain of the audio stream playback. The adjusted gain can be established by the hearing device manufacturer, a professional fitter of the hearing device via fitting software, or by the wearer via fitting software operating on an accessory device (e.g., a smartphone).

Figure 5:
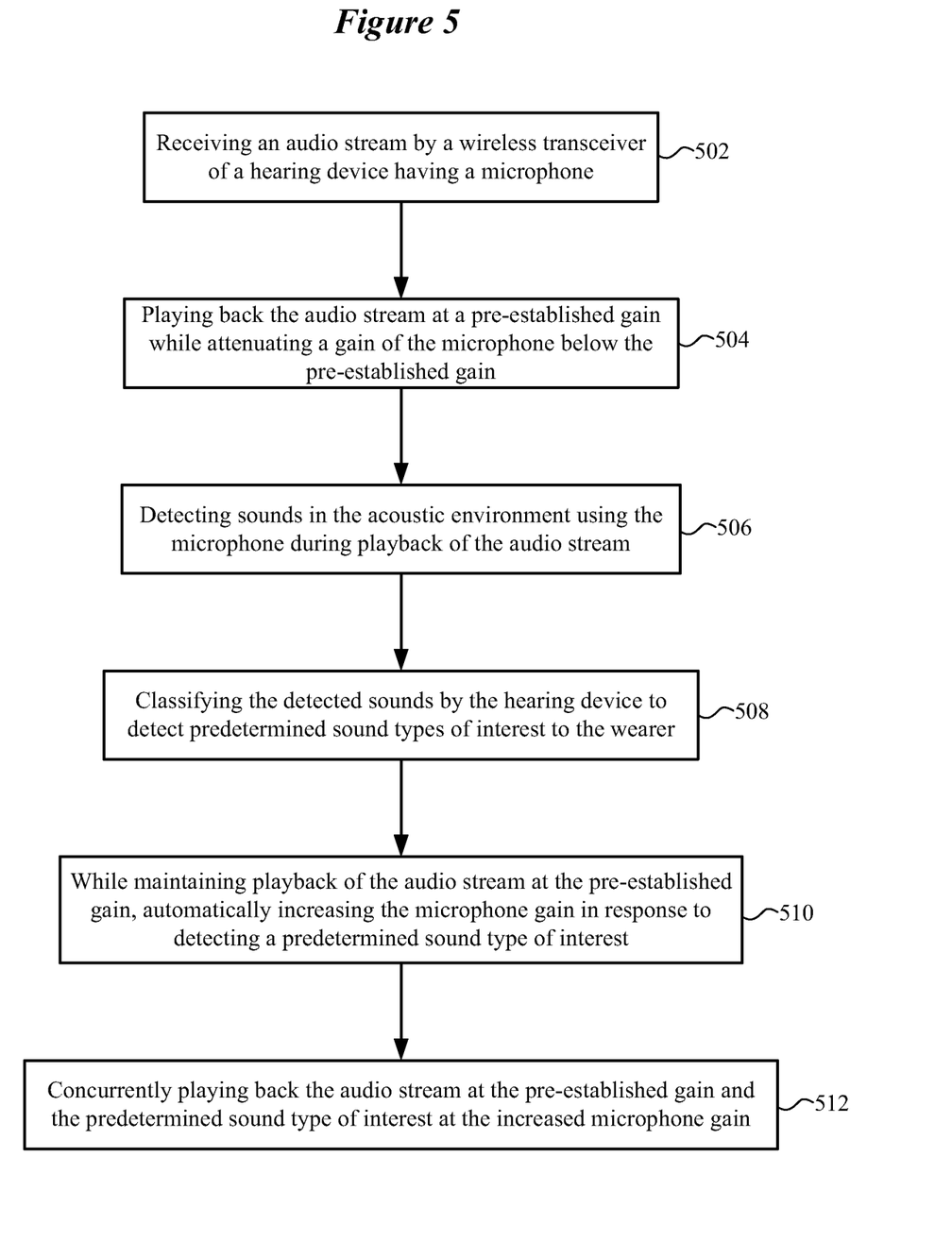
FIG. 5 shows a method of controlling microphone gain of a hearing device while streaming in accordance with other embodiments.

FIG. 5 shows a method of controlling microphone gain of a hearing device while streaming in accordance with some embodiments. The method involves receiving 502 an audio stream by a wireless transceiver of a hearing device having a microphone. The method involves playing back 504 the audio stream at a pre-established gain while attenuating gain of the microphone below the pre-established gain of the audio stream. The method also involves detecting 506 sounds in the acoustic environment using the microphone during playback of the audio stream. The method further involves classifying 508 the detected sounds by the hearing device to detect predetermined sound types of interest to the wearer.

While maintaining playback of the audio stream at the pre-established gain, the method involves automatically increasing 510 the microphone gain in response to detecting a predetermined sound type of interest. The method also involves concurrently playing back 512 the audio stream at the pre-established gain and the predetermined sound type of interest at the increased microphone gain. In some embodiments, the increased gain of the microphone is the same as the pre-established gain of the audio stream playback. In other embodiments, the increased gain of the microphone is lower than the pre-established gain of the audio stream playback. In further embodiments, the increased gain of the microphone is greater than the pre-established gain of the audio stream playback. The increased gain can be established by the hearing device manufacture, a professional fitter of the hearing device via fitting software, or by the wearer via fitting software operating on an accessory device (e.g., a smartphone).

According to various embodiments, the gain of the hearing device microphone(s) is adjusted dynamically relative to a pre-established gain of the audio stream playback. The pre-established gain at which an audio stream is played back to a wearer can be customized to the wearer. As was discussed previously, the wearer's pre-established gain preference for audio stream playback can be determined by the wearer or by a professional fitter. Alternatively or additionally, the pre-established streaming gain setting can be selected using manual switches of the hearing device or wirelessly via an interface of an accessory device (e.g., a smartphone or laptop), and this gain setting can be adjusted at any point during playback of an audio stream. In the case of a hearing impaired wearer, a fitter can customize the pre-established streaming gain setting of the hearing device to compensate for the wearer's hearing loss.

Various parameters of the hearing device can be adjusted to achieve a desired pre-established streaming gain, including gain values of the streaming channels and/or frequency bands, the compression ratio, the compression threshold, and the release time. For example, the compression ratio, compression threshold, and release time can be set to one set of values in one channel and another set of values in an adjacent channel. A channel may include one or more bands. Moreover, a number of pre-established streaming gain settings can be established for a corresponding number of different acoustic listening environments. For example, one memory can store a default pre-established streaming gain for streaming in a quiet environment (e.g., home), while another memory can store a default pre-established streaming gain for streaming in a noisy environment (e.g., a public venue such as a stadium). Also, these or different memories can store different initial gain levels for the microphone based on different acoustic listening environments.

Figure 6:
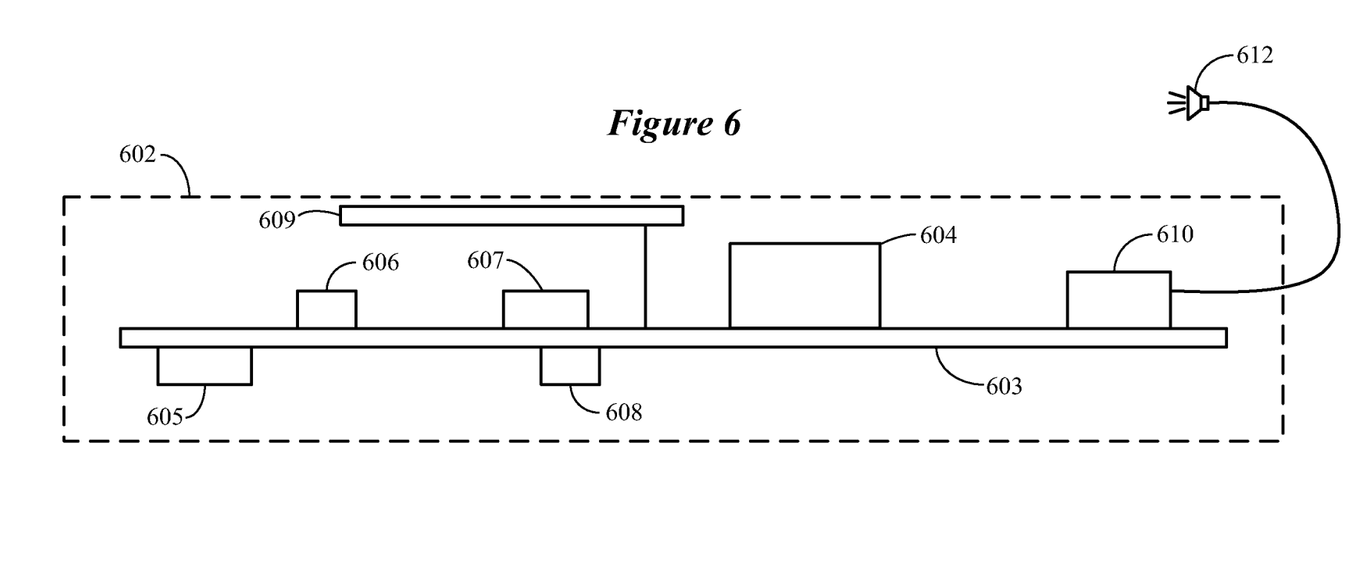
FIG. 6 is a block diagram showing various components of a hearing device that can be configured to dynamically adjust microphone gain while streaming in accordance with various embodiments.

FIG. 6 is a block diagram showing various components of a hearing device that can be configured to dynamically adjust microphone gain while streaming in accordance with various embodiments. The block diagram of FIG. 6 represents a generic hearing device for purposes of illustration. It is understood that the hearing device may exclude some of the components shown in FIG. 6 and/or include additional components.

The hearing device 602 shown in FIG. 6 includes several components electrically connected to a mother flexible circuit 603. A battery 605 is electrically connected to the mother flexible circuit 603 and provides power to the various components of the hearing device 602. One or more microphones 606 are electrically connected to the mother flexible circuit 603, which provides electrical communication between the microphones 606 and a DSP 604. Among other components, the DSP 604 includes audio signal processing circuitry and sound classification circuitry. One or more user switches 608 (e.g., on/off, volume, mic directional settings) are electrically coupled to the DSP 604 via the flexible mother circuit 603.

An audio output device 610 is electrically connected to the DSP 604 via the flexible mother circuit 603. In some embodiments, the audio output device 610 comprises a speaker (coupled to an amplifier). In other embodiments, the audio output device 610 comprises an amplifier coupled to an external receiver 612 adapted for positioning within an ear of a user. The hearing device 602 may incorporate a communication device 607 coupled to the flexible mother circuit 603 and to an antenna 609 directly or indirectly via the flexible mother circuit 603. The communication device 607 can be a Bluetooth® transceiver, such as a BLE (Bluetooth® low energy) transceiver or other transceiver (e.g., an IEEE 802.11 compliant device). The communication device 607 can be a telecoil or a loop system. In some embodiments, the communication device 607 includes any combination of a radio frequency transceiver, a telecoil, and a loop system, each of which is configured to receive a wireless stream.

Figure 7:
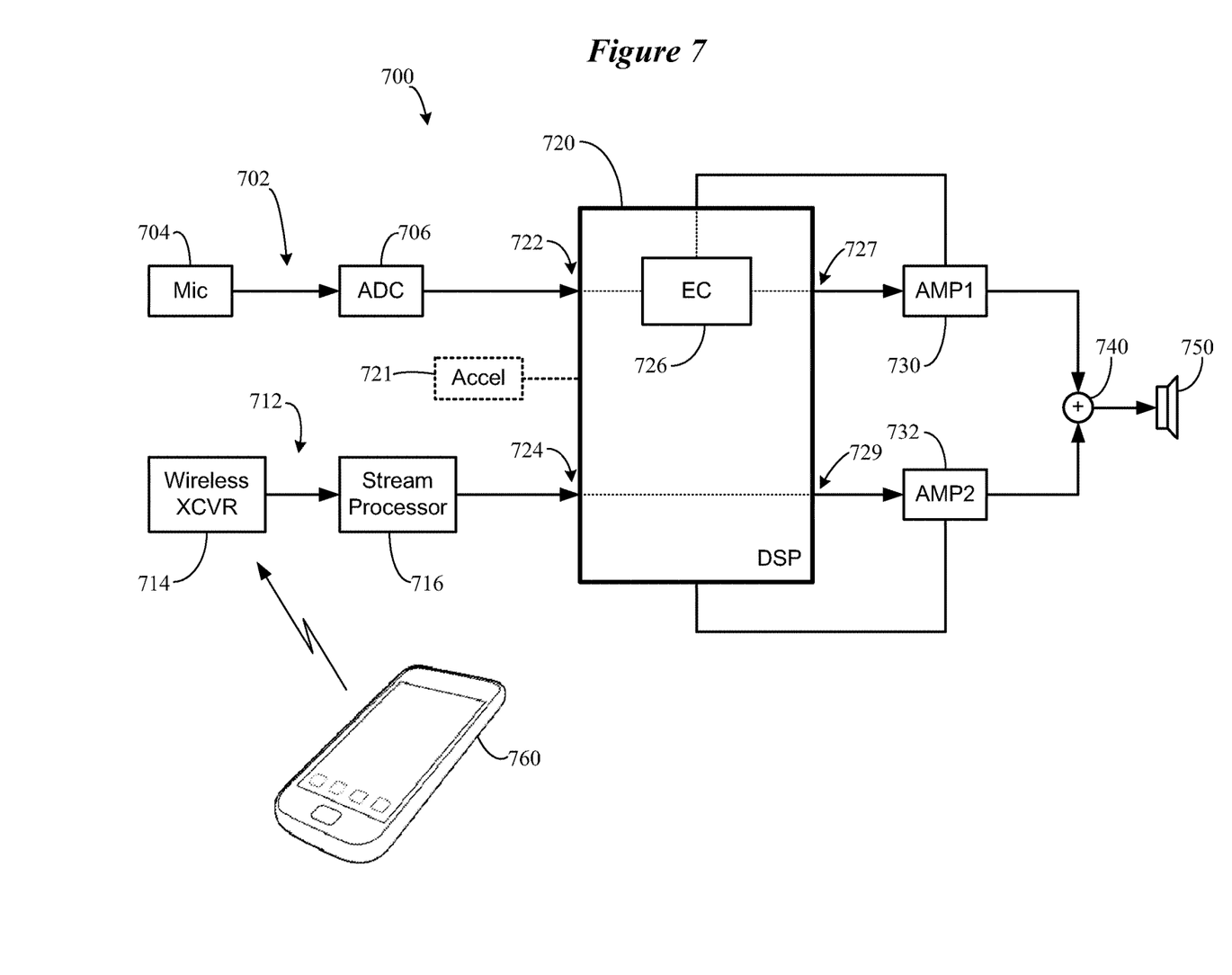
FIG. 7 is a block diagram of a hearing device circuitry configured to dynamically adjust microphone gain while streaming in accordance with various embodiments.

FIG. 7 is a block diagram of a hearing device circuitry configured to dynamically adjust microphone gain while streaming in accordance with various embodiments. The circuitry 700 shown in FIG. 7 includes an acoustic input 702 and a non-acoustic input 712. The acoustic and non-acoustic inputs 702 and 712 are respectively coupled to a DSP 720. The acoustic input 702 includes a microphone 704 having an output coupled to an input of an ADC (analog-to-digital converter) 706. The ADC 706 converts analog signals produce by the microphone 704 to digital signals which are input to a first input 722 of the DSP 720. The digitized microphone signals are processed by the DSP 720 and output to a first amplifier 730. The first amplifier 730 controls the gain of the microphone 704. For example, reducing the gain of the first amplifier 730 attenuates the microphone 704, while increasing the gain of the first amplifier 730 reduces attenuation of the microphone 704. It is noted that a separate amplifier may be included in the acoustic input 702 prior to the first input 722 of the DSP 720.

Although not shown in FIG. 7, the DSP 720 can include a WOLA (Weighted Overlap-Add) processor configured to perform WOLA analysis on the digitized microphone signals received from the acoustic input 702. A separate WOLA processor can be configured to perform WOLA analysis on the non-acoustic input 712. The WOLA processor(s) can be configured to filter the time-varying microphone signals into different frequency bands that overlap. The level of each band can be scaled to a certain weight, and then the segregated signals can be added back together to produce a smooth transfer function. The smoothness of the transfer function can be controlled with more frequency bands.

The non-acoustic input 712 includes a wireless transceiver 714, such as a BLE transceiver or an IEEE 802.11 compliant device. The wireless transceiver 714 is configured to receive wireless streaming from an audio source, such as any of the accessory devices described previously. An output of the wireless transceiver 714 is coupled to an input of a stream processor 716. The stream processor 716 can include a decoder and a sampling rate converter. An output of the stream processor 716 is coupled to the second input 724 of the DSP 720. The audio stream is processed by the DSP 720 and output to a second amplifier 732. The second amplifier 732 controls the gain of the audio stream.

The DSP 720 includes an EC (environmental classification) processor 726 which is configured to operate on the digitized microphone signals received from the acoustic input 702. The EC processor 726 is configured to monitor the microphone signals for a predetermined sound type of interest to the wearer. The EC processor 726 is configured to classify the ambient environment according to a number of distinguishable sound classes or sound types. For example, the EC processor 726 can be configured to distinguish between the following classes of sounds: speech; speech plus noise; quiet; wind noise; machine noise; and music. It is noted that other/additional classes of sound can be subject to classification by the EC processor 726. Some or all of these sound classes distinguishable by the EC processor 726 may be considered predetermined sound types of interest to the wearer. Sound environment classification performed by the EC 726 can be implemented in the manners disclosed in commonly owned U.S. Published Application Nos. 2011/0137656 and 2014/0177888, both of which are incorporated herein by reference.

As discussed above, the EC processor 726 can be configured to classify speech and speech plus noise in the ambient environment. According to some embodiments, the EC processor 726 can be configured to distinguish between speech originating from the wearer and speech by others in the ambient environment. The hearing device 700 can include an accelerometer 721 coupled to the DSP 720. The accelerometer 721 can be configured to detect vibrations resulting from speech uttered by the wearer of the hearing device 700. Speech uttered by others in the ambient environment does not produce vibrations detectable by the accelerometer 721. In response to the accelerometer 721 detecting speech uttered by the wearer, the DSP 720 can treat the wearer's speech differently than ambient speech.

In FIG. 7, an input of the first amplifier 730 is coupled to a first output 727 of the DSP 720. An input of the second amplifier 732 is coupled to a second output 729 of the DSP 720. It is understood that the DSP 720 includes digital-to-analog converters (DACs) that provide analog signals at the first and second outputs 727 and 729 of the DSP 720. Alternatively, digital signals can be provided at the first and second outputs 727 and 729 of the DSP 720, and DACs can be coupled between the first and second outputs 727 and 729 and inputs of the first and second amplifier 730 and 732. An output of the first amplifier 730 is coupled to a first input of a mixer 740. An output of the second amplifier 732 is coupled to a second input of the mixer 740. The mixer 740 is configured to mix the gain-adjusted microphone signals produced at the output of the first amplifier 730 with the audio stream (maintained at the pre-established gain) produced at the output of the second amplifier 732. An output of the mixer 740 is coupled to an input of a speaker 750. The mixed microphone signals and audio stream are played back to the wearer's ear via the speaker 750.

According to various embodiments, the DSP 720 maintains the gain of the second amplifier 732 at a pre-established gain while streaming. As such, the audio stream received by the non-acoustic input 712 and mixed with the microphone signals via the mixer 740 is played back to the wearer's ear at the pre-established again via the speaker 750. The gain of the first amplifier 730 is set to a first microphone gain by the DSP 720 upon initiating audio streaming. The first microphone gain is preferably gain lower than the pre-established audio stream gain, but can be based on wearer or professional preference. For example, the first microphone gain can be achieved by a zero or minimum gain setting of the microphone 704 or by a muting function of the microphone 704. In some embodiments, the first gain can be a microphone gain customized for or selected by the wearer. In other embodiments, the first microphone gain can be a default or recommended gain established by the manufacturer which can be changed by the wearer. Maintaining the microphone gain at gain significantly lower than the pre-established audio stream gain during streaming serves to enhance listening of the audio stream (e.g., by reducing microphone/ambient environment noise).

When monitoring the acoustic environment using the microphone 704 while streaming, the DSP 720 can adjust the microphone gain by adjusting the gain of predetermined frequency bands that enhance wearer perception of a predetermined sound type of interest in the acoustic environment. Adjustment of the microphone frequency bands can be predetermined by the manufacturer and/or adjusted by the user as desired. For example, if the EC processor 726 detects the presence of speech while streaming, the DSP 720 can adjust the microphone frequency bands that serve to enhance intelligibility of the speech when adjusting the gain of the first amplifier 730.

While actively streaming via the non-acoustic input 712, the EC 726 is configured to monitor signals produced by the microphone 704 for a predetermined sound type of interest to the wearer. As was previously discussed, a predetermined sound type of interest can be one or more of the sounds that can be classified by the EC processor 726. In response to detecting a predetermined sound type of interest by the EC 726, the DSP 720 automatically adjusts the gain of the first amplifier 730 from a first microphone gain to a second microphone gain. The first microphone gain can be gain discussed in the previous paragraph. The second microphone gain can be gain substantially the same as the pre-established audio stream gain (e.g., gain of the first amplifier 730 equals the gain of the second amplifier 732). The second microphone gain can alternatively be gain established for or by the wearer, which may be lower or higher than the pre-established audio stream gain. The second microphone gain can be different for each of a number of different predetermined sound types of interest. For example, the DSP 720 can adjust the gain of the first amplifier 730 to be equivalent with that of the second amplifier 732 in response to detecting speech in the ambient environment. The DSP 720 can adjust the gain of the first amplifier 730 to be less than that of the second amplifier 732 in response to detecting machine noise, which can be done on a channel-by-channel basis.

Table 1 below illustrates how the DSP 720 can adjust the gain of the first amplifier 730 coupled to the microphone 704 in response to detecting different predetermined sound types of interest to the wearer.

| Classified Environment | Microphone Gain (relative to initial gain) |
| --- | --- |
| Speech | +(increase gain) |
| Speech + Noise | −(decrease gain) |
| Quiet | do not change |
| Wind Noise | −(decrease gain) |
| Machine Noise | −(decrease gain) |
| Music | do not change |
| Other | do not change |

Table 1 above lists a number of different sound environments that can be classified by the EC 726 of the DSP 720. In response to classifying the predetermined sound type of interest as human speech, the DSP 720 can increase the gain of the first amplifier 730 coupled to the microphone 704 relative to its initial gain. In response to classifying the predetermined sound type of interest as human speech plus noise, the DSP 720 can decrease the gain of the first amplifier 730 relative to its initial gain, thereby attenuating the microphone 704. In response to classifying the predetermined sound type of interest as quiet, no change to the gain of the first amplifier 730 is made by the DSP 720. In response to classifying the predetermined sound type of interest as wind noise or machine noise, the DSP 720 can decrease the gain of the first amplifier 730 relative to its initial gain, thereby attenuating the microphone 704. In response to classifying the predetermined sound type of interest as music, no change to the gain of the first amplifier 730 is made by the DSP 720. It is noted that increasing and decreasing the gain as indicated in Table 1 above is effected by the DSP 720 based on the initial gain. For example, if the microphone 704 is fully attenuated by default (e.g., muted), it would not be possible for the DSP 720 further reduce the microphone gain.

Table 1 represents default dynamic microphone gain adjustments that can be made by the DSP 720 in response to detecting different predetermined sound types of interest to the wearer. It is understood that these default dynamic microphone gain adjustments can be changed by the user based on specific preferences. These preferences could be set in the fitting software by a hearing professional (for a hearing aid application) or in a mobile application by the wearer (for a hearing aid or hearable application). It is to be understood that the classified environments and microphone gain adjustments listed in Table 1 above are provided for non-limiting illustrative purposes.

FIG. 7 shows an accessory device 760 in communication with the hearing device via the wireless transceiver 714. In the representative embodiment shown in FIG. 7, the accessory device 760 is a smartphone. According to various embodiments, the DSP 720 generates a signal in response to the EC 726 detecting a predetermined sound type of interest to the wearer. The DSP signal is transmitted by the wireless transceiver 714 to the accessory device 760 via a wireless communication link. In response to receiving the DSP signal, the accessory device 760 displays information about the predetermined sound type of interest. For example, the accessory device 760 can display the message "Someone is talking to you" in response to the EC 726 detecting human speech as the predetermined sound type of interest. As another example, the accessory device 760 can display the message "There is music playing" in response to the EC 726 detecting music as the predetermined sound type of interest. As a further example, the accessory device 760 can display the message "There is machine noise present" in response to detecting machine noise as the predetermined sound type of interest. The accessory device 760 can be programmed to generate sounds, display information, vibrate, or perform a combination of these and other functions in response to receiving a signal from the hearing device that a certain predetermined sound type of interest has been detected.

Figure 8:
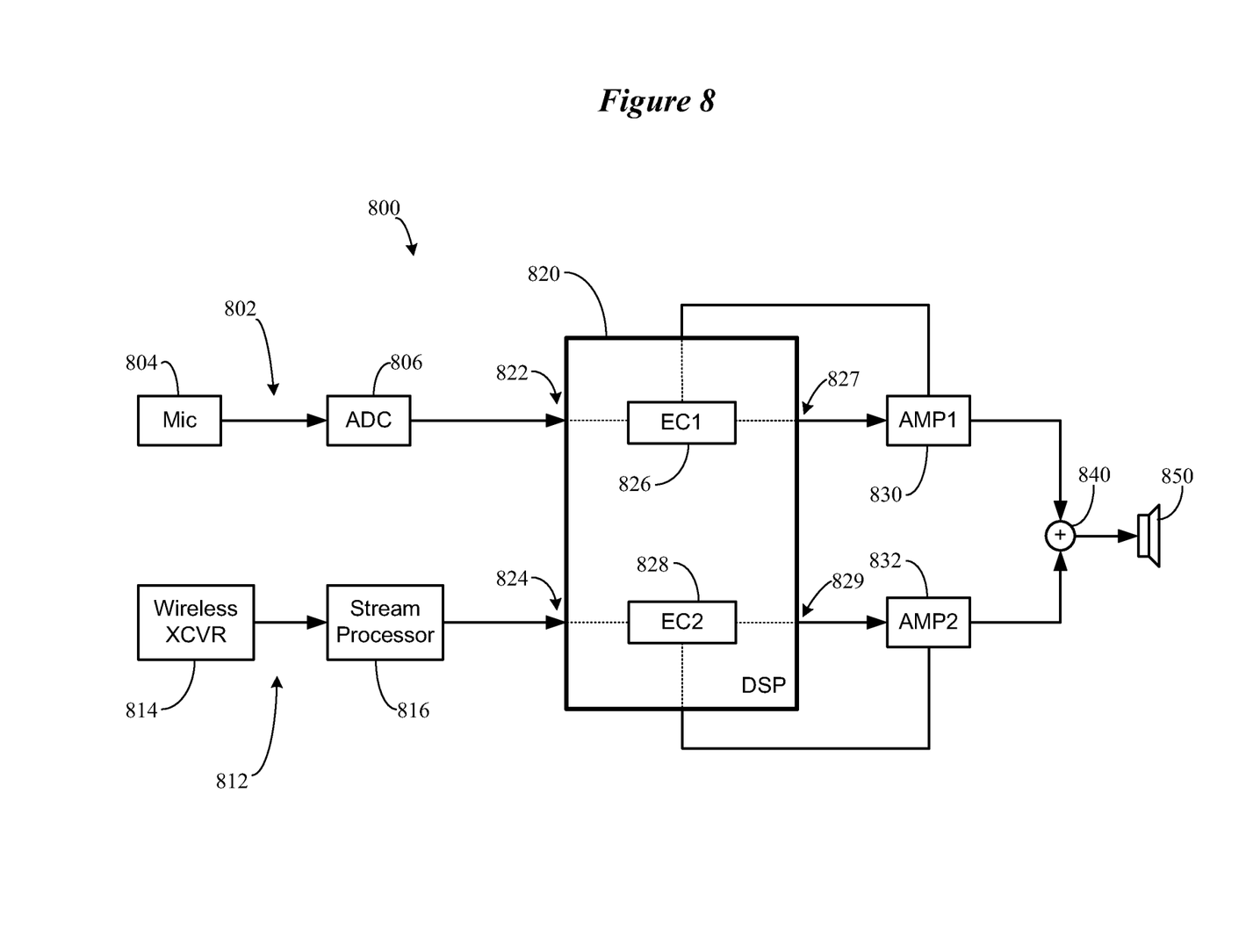
FIG. 8 is a block diagram of a hearing device circuitry configured to dynamically adjust microphone gain while streaming in accordance with various embodiments.

FIG. 8 is a block diagram of hearing device circuitry configured to dynamically adjust microphone gain while streaming in accordance with various embodiments. The circuitry 800 shown in FIG. 8 includes an acoustic input 802 and a non-acoustic input 812. The acoustic input 802 includes a microphone 804 coupled to an ADC 806, an output of which is coupled to a first input 822 of a DSP 820. The non-acoustic input 812 includes a wireless transceiver 814 coupled to a stream processor 816, an output of which is coupled to a second input 824 of the DSP 820. A first output 827 of the DSP 820 is coupled to an input of a first amplifier 830. A second output 829 of the DSP 820 is coupled to an input of a second amplifier 832. Outputs from the first and second amplifiers 830 and 832 are coupled to respective inputs of a mixer 840. An output of the mixer 840 is coupled to a speaker 850. The circuitry shown in FIG. 8 generally operates in a manner the same as or similar to that described previously with regard to the circuitry of FIG. 7.

In the embodiment shown in FIG. 8, the DSP 820 includes a first EC processor 826 and a second EC processor 828. The first EC processor 826 is configured to classify sounds in the microphone signals received from the acoustic input 802. The second EC processor 828 is configured to classify sounds in the audio stream received from the non-acoustic input 812. Inclusion of a dedicated EC processor 828 for the non-acoustic input 812 allows the DSP 820 to classify sounds in the audio stream independently from classifying sounds in the microphone signals, which provides for more precise classification. It is noted that WOLA processors can be included in the DSP 820 for independently performing WOLA analysis on the microphone signals and audio stream.

Figure 9:
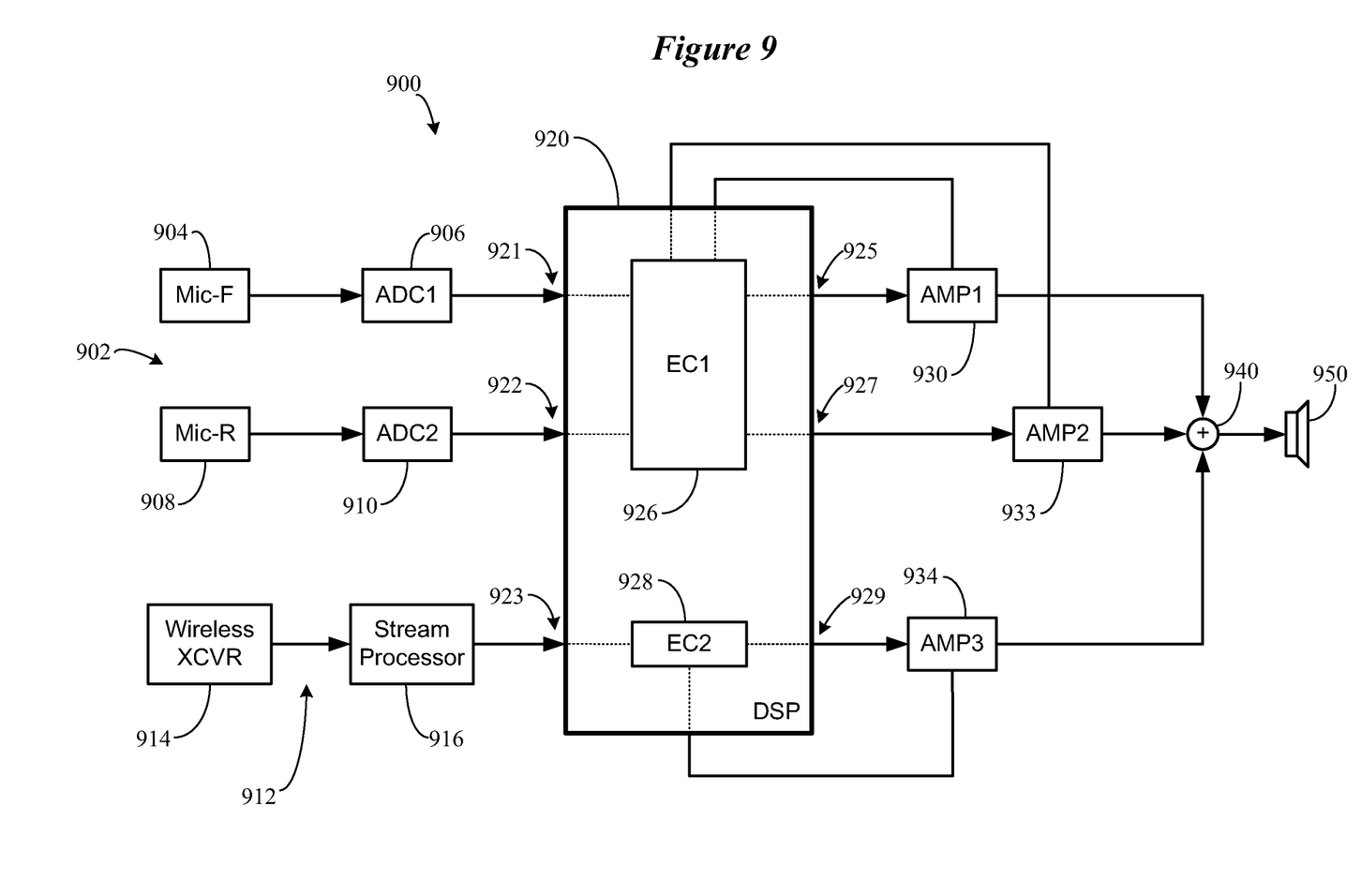
FIG. 9 is a block diagram of a hearing device circuitry configured to dynamically adjust microphone gain while streaming in accordance with various embodiments.

FIG. 9 is a block diagram of hearing device circuitry configured to dynamically adjust microphone gain while streaming in accordance with various embodiments. The circuitry 900 shown in FIG. 9 includes an acoustic input 902 and a non-acoustic input 912. The acoustic input 902 includes a first microphone 904 coupled to an ADC 906, an output of which is coupled to a first input 921 of a DSP 920. The acoustic input 902 includes a second microphone 908 coupled to an ADC 910, an output of which is coupled to a second input 922 of the DSP 920. The first microphone 904 may be a front microphone provided on the front end of the hearing device, and the second microphone 908 may be a rear microphone provided on the read end of the hearing device. The non-acoustic input 912 includes a wireless transceiver 914 coupled to a stream processor 916, an output of which is coupled to a third input 923 of the DSP 920. It is noted that WOLA processors can be included in the DSP 920 for independently performing WOLA analysis on the microphone signals and audio stream.

A first output 925 of the DSP 920 is coupled to an input of a first amplifier 930. A second output 927 of the DSP 920 is coupled to an input of a second amplifier 933. A third output 929 is coupled to an input of a third amplifier 934. Outputs from the first, second, and third amplifiers 930, 933, and 934 are coupled to respective inputs of a mixer 940. An output of the mixer 940 is coupled to a speaker 950. The circuitry shown in FIG. 9 generally operates in a manner the same as or similar to that described previously with regard to the circuitry of FIG. 8.

In the embodiment shown in FIG. 9, the DSP 920 includes a first EC processor 926 and a second EC processor 928. The first EC processor 926 is configured to classify sounds in the microphone signals received from the first and second microphones 904 and 908 of the acoustic input 902. The second EC processor 928 is configured to classify sounds in the audio stream received from the non-acoustic input 912. Inclusion of a dedicated EC processor 928 for the non-acoustic input 912 allows the DSP 920 to classify sounds in the audio stream independently from classifying sounds in the microphone signals. In particular, inclusion of the dedicated EC processors 926 and 928 facilitates classification of wind by the EC processor 926 using microphone signals from the first and second microphones 904 and 908. When classifying wind, the EC 926 is configured to compare the power level of the microphone signals produced from the first and second microphones 904 and 908 to determine the presence of wind. The EC 926 relies on the difference between the front and rear microphone power levels to determine the presence of wind.

This document discloses numerous embodiments, including but not limited to the following:

Item 1 is a method implemented by a hearing device adapted to be worn by a wearer, the method comprising:
  receiving an audio stream via a wireless transceiver of the hearing device;
  playing back the audio stream to the wearer at a pre-established gain via a speaker of the hearing device;
  monitoring, using a microphone of the hearing device, for a predetermined sound type of interest to the wearer during playback of the audio stream;
  while maintaining playback of the audio stream at the pre-established gain, automatically adjusting gain of the microphone in response to detecting the predetermined sound type of interest; and
  concurrently playing back the audio stream at the pre-established gain and the predetermined sound type of interest at the adjusted gain.

Item 2 is the method of item 1, wherein the pre-established audio stream gain is gain that is customized for the hearing of the wearer.

Item 3 is the method of item 1, wherein adjusting the microphone gain comprises adjusting the microphone gain from a first microphone gain lower than the pre-established audio stream gain to a second microphone gain.

Item 4 is the method of item 3, wherein the first microphone gain is achieved by a zero or minimum gain setting of the microphone or by a muting function of the microphone.

Item 5 is the method of item 3, wherein the first microphone gain is a microphone gain customized for or selected by the wearer.

Item 6 is the method of item 1, wherein adjusting the microphone gain comprises adjusting the microphone gain from a first microphone gain lower than the pre-established audio stream gain to a second microphone gain substantially the same as the pre-established audio stream gain.

Item 7 is the method of item 1, wherein adjusting the microphone gain comprises adjusting the gain of predetermined frequency bands that enhance wearer perception of the predetermined sound type of interest.

Item 8 is the method of item 1, wherein the predetermined sound type of interest is human speech, an alarm, an alert, or a siren.

Item 9 is the method of item 1, wherein the predetermined sound of interest comprises one of a plurality of predetermined sound types of interest selected by the wearer.

Item 10 is the method of item 1, further comprising:
  transmitting a signal from the hearing device to a portable electronic device proximate the wearer in response to detecting the predetermined sound type of interest; and
  displaying information about the detected predetermined sound type of interest on a display of the portable electronic device in response to the signal.

Item 11 is a hearing device adapted to be worn by a wearer, comprising:
  a microphone configured to produce microphone signals and coupled to an input of a first amplifier;
  a wireless transceiver configured to receive an audio stream and coupled to an input of a second amplifier, the second amplifier configured to amplify the audio stream at a pre-established gain;
  a speaker; and
  a digital signal processor (DSP) coupled to the microphone and the first and second amplifiers;
  wherein the DSP is configured to monitor the microphone signals for a predetermined sound type of interest to the wearer during playback of the audio stream by the speaker and, while maintaining playback of the audio stream at the pre-established gain, automatically adjust gain of the first amplifier coupled to the microphone in response to detecting the predetermined sound type of interest.

Item 12 is the hearing device of item 11, wherein the DSP is configured to implement an environmental classification algorithm to classify sounds received by the microphone.

Item 13 is the hearing device of item 11, wherein the DSP comprises:

a first sound classification processor configured to implement an environmental classification algorithm to classify sounds received by the microphone; and a second sound classification processor configured to implement an environmental classification algorithm to classify sounds in the audio stream received by the transceiver.

Item 14 is the hearing device of item 11, wherein:

the hearing device comprises a front microphone and a rear microphone; and the DSP comprises:

a first sound classification processor configured to implement an environmental classification algorithm to classify sounds received by the front and rear microphones; and a second sound classification processor configured to implement an environmental classification algorithm to classify sounds in the audio stream received by the transceiver.

Item 15 is the hearing device of item 11, wherein the pre-established audio stream gain is gain that is customized for or selected by the hearing of the wearer.

Item 16 is the hearing device of item 11, wherein the DSP is configured to adjust the gain of the first amplifier from a first microphone gain lower than the pre-established audio stream gain to a second microphone gain.

Item 17 is the hearing device of item 15, wherein the first microphone gain is achieved by a zero or minimum gain setting of the microphone or by a muting function of the microphone.

Item 18 is the hearing device of item 11, wherein the DSP is configured to adjust the gain of the first amplifier from a first microphone gain lower than the pre-established audio stream gain to a second microphone gain substantially the same as the pre-established audio stream gain.

Item 19 is the hearing device of item 11, wherein the DSP is configured to adjust the gain of the first amplifier by adjusting the gain of predetermined frequency bands that enhance wearer perception of the predetermined sound type of interest.

Item 20 is the hearing device of item 11, wherein:

the transceiver is configured to transmit a signal from the hearing device to a portable electronic device proximate the wearer; and the portable electronic device is configured to communicate information about the predetermined sound type of interest in response to the signal.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method implemented by a hearing device adapted to be worn by a wearer, the method comprising:

receiving an audio stream via a wireless communication device of the hearing device;

playing back the audio stream to the wearer at a pre-established gain via a speaker of the hearing device;

monitoring, using a microphone of the hearing device, for a predetermined sound type during playback of the audio stream; and automatically adjusting gain of the microphone relative to the pre-established gain during playback of the audio stream in response to detecting presence or absence of the predetermined sound type.

2. The method of claim 1, wherein adjusting the microphone gain comprises decreasing the microphone gain during playback of the audio stream in response to detecting absence of the predetermined sound type.

3. The method of claim 1, wherein adjusting the microphone gain comprises increasing the microphone gain during playback of the audio stream in response to detecting presence of the predetermined sound type.

4. The method of claim 1, wherein adjusting the microphone gain comprises:

decreasing the microphone gain during playback of the audio stream in response to detecting absence of the predetermined sound type; and increasing the microphone gain during playback of the audio stream in response to detecting presence of the predetermined sound type.

5. The method of claim 1, wherein the pre-established audio stream gain is gain that is customized for the hearing of the wearer.

6. The method of claim 1, wherein automatically adjusting the microphone gain comprises automatically adjusting the microphone gain from a first microphone gain lower than the pre-established audio stream gain to a second microphone gain in response to detecting presence of the predetermined sound type.

7. The method of claim 6, wherein:

the first microphone gain is achieved by a zero or minimum gain setting of the microphone or by a muting function of the microphone; or the first microphone gain is a microphone gain customized for or selected by the wearer.

8. The method of claim 6, wherein the second microphone gain is a microphone gain substantially the same as the pre-established audio stream gain.

9. The method of claim 1, wherein automatically adjusting the microphone gain comprises adjusting gain of predetermined frequency bands that enhance wearer perception of the predetermined sound type.

10. The method of claim 1, wherein the predetermined sound type comprises at least one of human speech, an alarm, an alert, a siren, and a predetermined sound type selected by the wearer.

11. The method of claim 1, further comprising:

transmitting a signal from the hearing device to a portable electronic device proximate the wearer in response to detecting presence of the predetermined sound type; and displaying information about the detected predetermined sound type on a display of the portable electronic device in response to the transmitted signal.

12. A hearing device adapted to be worn by a wearer, comprising:

a microphone configured to produce microphone signals and coupled to an input of a first amplifier;

a wireless transceiver configured to receive an audio stream and coupled to an input of a second amplifier, the second amplifier configured to amplify the audio stream at a pre-established gain;

a speaker; and a digital signal processor (DSP) coupled to the microphone and the first and second amplifiers;

wherein the DSP is configured to monitor the microphone signals for a predetermined sound type during playback of the audio stream and automatically adjust gain of the first amplifier relative to the pre-established gain during playback of the audio stream in response to detecting presence or absence of the predetermined sound type.

13. The hearing device of claim 12, wherein the DSP is configured to implement an environmental classification algorithm to classify sounds received by the microphone.

14. The hearing device of claim 12, wherein the DSP comprises:
a first sound classification processor configured to implement an environmental classification algorithm to classify sounds received by the microphone; and
a second sound classification processor configured to implement an environmental classification algorithm to classify sounds in the audio stream received by the transceiver.

15. The hearing device of claim 12, wherein:
the hearing device comprises a front microphone and a rear microphone; and
the DSP comprises:
a first sound classification processor configured to implement an environmental classification algorithm to classify sounds received by the front and rear microphones; and
a second sound classification processor configured to implement an environmental classification algorithm to classify sounds in the audio stream received by the transceiver.

16. The hearing device of claim 12, wherein the DSP is configured to:
automatically decrease gain of the first amplifier relative to the pre-established gain during playback of the audio stream in response to detecting absence of the predetermined sound type; and
automatically increase gain of the first amplifier relative to the pre-established gain during playback of the audio stream in response to detecting presence of the predetermined sound type.

17. The hearing device of claim 12, wherein the pre-established audio stream gain is gain that is customized for the hearing of the wearer.

18. The hearing device of claim 12, wherein the DSP is configured to adjust the gain of the first amplifier from a first microphone gain lower than the pre-established audio stream gain to a second microphone gain substantially the same as the pre-established audio stream gain.

19. The hearing device of claim 12, wherein the DSP is configured to automatically adjust gain of predetermined frequency bands that enhance wearer perception of the predetermined sound type.

20. The hearing device of claim 12, wherein the predetermined sound type comprises at least one of human speech, an alarm, an alert, a siren, and a predetermined sound type selected by the wearer.

21. The hearing device of claim 12, wherein:
the transceiver is configured to transmit a signal from the hearing device to a portable electronic device proximate the wearer; and
the portable electronic device is configured to communicate information about the detected predetermined sound type in response to the signal.

22. A hearing device adapted to be worn by a wearer, comprising:
a microphone configured to produce microphone signals and coupled to an input of a first amplifier;
a wireless transceiver configured to receive an audio stream and coupled to an input of a second amplifier, the second amplifier configured to amplify the audio stream at a pre-established gain;
a speaker; and
a digital signal processor (DSP) coupled to the microphone and the first and second amplifiers;
wherein the DSP is configured to:
monitor the microphone signals for a predetermined sound type during playback of the audio stream, the predetermined sound type comprising at least one of human speech, an alarm, an alert, a siren, and a predetermined sound type selected by the wearer;
automatically decrease gain of the first amplifier relative to the pre-established gain during playback of the audio stream in response to detecting absence of the predetermined sound type; and
automatically increase gain of the first amplifier relative to the pre-established gain during playback of the audio stream in response to detecting presence of the predetermined sound type.

\* \* \* \* \*